(12) United States Patent
Kalchbrenner et al.

(10) Patent No.: US 11,468,295 B2
(45) Date of Patent: Oct. 11, 2022

(54) GENERATING OUTPUT EXAMPLES USING BIT BLOCKS

(71) Applicant: DeepMind Technologies Limited, London (GB)

(72) Inventors: Nal Emmerich Kalchbrenner, London (GB); Karen Simonyan, London (GB); Erich Konrad Elsen, San Francisco, CA (US)

(73) Assignee: DeepMind Technologies Limited, London (GB)

( * ) Notice: Subject to any disclaimer, the term of this patent is extended or adjusted under 35 U.S.C. 154(b) by 1143 days.

(21) Appl. No.: 15/985,628

(22) Filed: May 21, 2018

(65) Prior Publication Data

US 2018/0336455 A1 Nov. 22, 2018

Related U.S. Application Data

(60) Provisional application No. 62/628,910, filed on Feb. 9, 2018, provisional application No. 62/509,051, filed on May 19, 2017.

(51) Int. Cl.
*G06N 3/04* (2006.01)
*G06N 3/08* (2006.01)

(52) U.S. Cl.
CPC ......... *G06N 3/0472* (2013.01); *G06N 3/0454* (2013.01); *G06N 3/088* (2013.01)

(58) Field of Classification Search
CPC ..... G06N 3/0454; G06N 3/0472; G06N 3/088
See application file for complete search history.

(56) References Cited

PUBLICATIONS

Reed et al., "Parallel Multiscale Autoregressive Density Estimation", Mar. 10, 2017, eprint arXiv:1703.03664, pp. 1-16 (Year: 2017).*
Kalchbrenner et al., "Video Pixel Networks", Oct. 3, 2016, arXiv:1610.00527v1, pp. 1-16 (Year: 2016).*
PCT International Preliminary Report on Patentability in International Appln. No. PCT/EP2018/063305, dated Nov. 28, 2019, 10 pages.
'blog.openai.com' [online] "Block-sparse gpu kernels," Dec. 2017 [retrieved on Nov. 19, 2018] Retrieved from Internet: URL:<htlps://blog.openai.com/block-sparse-gpu-kernels/> 6 pages.

(Continued)

*Primary Examiner* — Brent Johnston Hoover
(74) *Attorney, Agent, or Firm* — Fish & Richardson P.C.

(57) ABSTRACT

Methods, systems, and apparatus, including computer programs encoded on computer storage media, for generating output examples using neural networks. One of the methods includes receiving a request to generate an output example of a particular type, accessing dependency data, and generating the output example by, at each of a plurality of generation time steps: identifying one or more current blocks for the generation time step, wherein each current block is a block for which the values of the bits in all of the other blocks identified in the dependency for the block have already been generated; and generating the values of the bits in the current blocks for the generation time step conditioned on, for each current block, the already generated values of the bits in the other blocks identified in the dependency for the current block.

20 Claims, 5 Drawing Sheets

(56) References Cited

PUBLICATIONS

'browser.geekbench.com' [online] "Google Pixel 2 XL," Copyright 2004-2018 [Retrieved on Nov. 16, 2018] retrieved from Internet: URL<https://browser.geekbench.com/v4/cpu/6473830> 6 pages.

'browser.geekbench.com' [online] "LG Nexus 5x," Copyright 2004-2018, [retrieved on Nov. 16, 2018] Retrieved from Internet:URL<https://browser.geekbench.com/v4/cpu/6960655> 6 pages.

'magenta.tensorflow.org' [online] "Performance RNN: Generating music with expressive timing and dynamics," Jun. 29, 2017, [retrieved on Nov. 19, 2018] Retrieved from Internet: URL<https://magenta.tensorflow.org/performance-rnn>_9 pages.

'svail.github.io' [online] "Optimizing RNNs with Differentiable Graphs," Engel, Available on or before Jul. 19, 2016 via the wayback internet archive [retrieved on Nov. 19, 2018] Retrieved from Internet: URL<https://svail.github.io/diff_graphs/> 16 pages.

Engel et al. "Neural audio synthesis of musical notes with wavenet autoencoders," arXiv 1704.01279, 16 pages.

Gordon et al. "MorphNet: Fast & Simple Resource-Constrained Structure Learning of Deep Networks," arXiv preprints, Nov. 2017, 15 pages.

Gu et al. "Non-autoregressive neural machine translation," arXiv 1711.02281v2, Mar. 9, 2018, 13 pages.

Gulcehre et al. "Empirical evaluation of gated recurrent neural networks on sequence modeling," arXiv 1412.3555v1, Dec. 11, 2014, 9 pages.

Kalchbrenner et al. "Neural Machine translation in Unear time," arXiv1610.10099v2, Mar. 15, 2017, 9 pages.

Kalchbrenner et al. "Video Pixel Networks," arXiv 1610.00527 Oct. 3, 2016, 16 pages.

Lee et al. "Viterbi-based pruning for sparse matrix with fixed and high index compression ratio," Pubhshed as a conference paper at ICLR, Apr. 30-May 3, 2018, 16 pages.

Mehri et al. "SampleRNN: an unconditional end-to-end neural audio generation model," arXiv1612.07837v2, Feb. 11, 2017, 11 pages.

Narang et al. "Block-sparse recurrent neural networks," arXiv1711.02782, Nov. 8, 2017, 12 pages.

Narang et al. "Exploring sparsity in recurrent neural networks," arXiv1704.05119v2, Nov. 6, 2017, 10 pages.

PCT International Search Report and Written Opinion issued in International Application No. PCT/EP2018/063305, dated Aug. 28, 2018, 16 pages.

Reed et al. "Parallel Multiscale Autoregressive Density Estimation," arXiv 1703.03664v1, Mar. 10, 2017, 16 pages.

Salimans et al. "PixelCNN++: Improving the pixelenn with disretized logistic mixture likelihood and other modifications," arXiv 1701.05517, Jan. 19, 2017, 10 pages.

Sengupta et al. "Persistent RNNs: Stashing recurrent weights on-chip," International Conference on machine Learning, Jun. 11, 2016, 10 pages.

Van den Oord et al. "Conditional Image Generation with PixelCNN Decoders," arXiv 1606.05328v2, Jun. 18, 2016, 13 pages.

Van den Oord et al. "Parallel Wavenet: Fast high-fidelity speech synthesis," arXiv 1711.10433v1, Nov. 28, 2017, 11 pages.

Van den Oord et al. "Pixel Recurrent Neural Networks," arXiv 1601.06759v3, Aug. 19, 2016, 11 pages.

Van den Oord et al. "WaveNet: A Generative Model for Raw Audio," SSW Sep. 2016, 15 pages.

Vaswani et al. "Attention is all you need," Advances in Neural Information Processing Systems, Dec. 2017, 11 pages.

Wang et al. "Tacotrol: A fully end-to-end text-to-speech synthesis model," arXiv 1703.10135v1, Mar. 29, 2017, 10 pages.

Wu et al. "Google's neural machine translation system: Bridging the gap between human and machine translation," arXiv 1609.08144v2, Oct. 8, 2016, 23 pages.

Xiao et al. "Inter-block GPU communication via fast barrier synchronization," IEEE International Symposium on Parallel Distributed Processing, Apr. 2010, 11 pages.

Zhu et al. "To prune, or not to prune: exploring the efficacy of pruning for model compression," arXiv 1710.01878, 11 pages.

Extended Search Report and Written Opinion in European Appln. No. 21202823.7, dated Jan. 19, 2022, 11 pages.

\* cited by examiner

GENERATING OUTPUT EXAMPLES USING BIT BLOCKS

CROSS-REFERENCE TO RELATED APPLICATIONS

This application claims priority to U.S. Provisional Application No. 62/509,051, filed on May 19, 2017, and claims priority to U.S. Provisional Application No. 62/628,910, filed on Feb. 9, 2018. The disclosures of the prior applications are considered part of and are incorporated by reference in the disclosure of this application.

BACKGROUND

This specification relates to generating output examples using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can generate an output example, e.g., conditioned on a context input.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Particular embodiments of the subject matter described in this specification can be implemented so as to realize one or more of the following advantages.

By generating output examples bit block by bit block, high quality output examples can be generated more quickly. In particular, by reducing the dependency requirements for bit blocks in the output example as described in this specification, additional speed ups can be achieved without much degradation in the quality of the output examples. Because the requirements are reduced as described in this specification to leverage the structure of the output examples, the reduction in dependencies does not adversely affect the quality of the generated output examples to any significant degree.

That is, by making use of dependency data as described in this specification instead of requiring that the bits in a given output sample depend on the bits on all previously generated output samples, the described systems can generate output examples in fewer inference steps (referred to in this specification as "generation time steps") than conventional systems that auto-regressively generate output examples while generating output examples of comparable quality to the conventional systems.

Moreover, the generation of the bit blocks can be parallelized, resulting in a significant decrease in the time required to generate an output example. That is, in implementations where parallelization is employed, the time required to generate an output example is further reduced, because in addition to requiring fewer inference steps, some of the inference steps are performed in parallel.

For example, a waveform of speech that is an utterance of an input text segment can be effectively and quickly generated using the techniques described in this specification.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows another example dependency.

Like reference numbers and designations in the various drawings indicate like elements.

DETAILED DESCRIPTION

This specification generally describes techniques for generating output examples that include an ordered collection of output samples.

Some conventional systems generate output examples in an auto-regressive manner. In particular, the conventional systems generate each given output sample in the output example conditioned on the already generated output samples that precede the given output sample in the order. In other words, in order to generate a given output sample, the conventional systems must have already generated all of the output samples that precede the given output sample in the order. While this may result in a high quality output example being generated, this strict dependency requirement requires the output example to be generated over many generation time steps.

The system described in this specification, on the other hand, generates output examples with reduced dependency requirements that do not require all of the output samples that precede the given output sample in the order to already have been generated to generate at least some of the bits of the given output sample. Because of the way in which the dependency is reduced, the output examples are still of a high quality but can be generated much quicker, i.e., over many fewer generation time steps.

Figure 1:
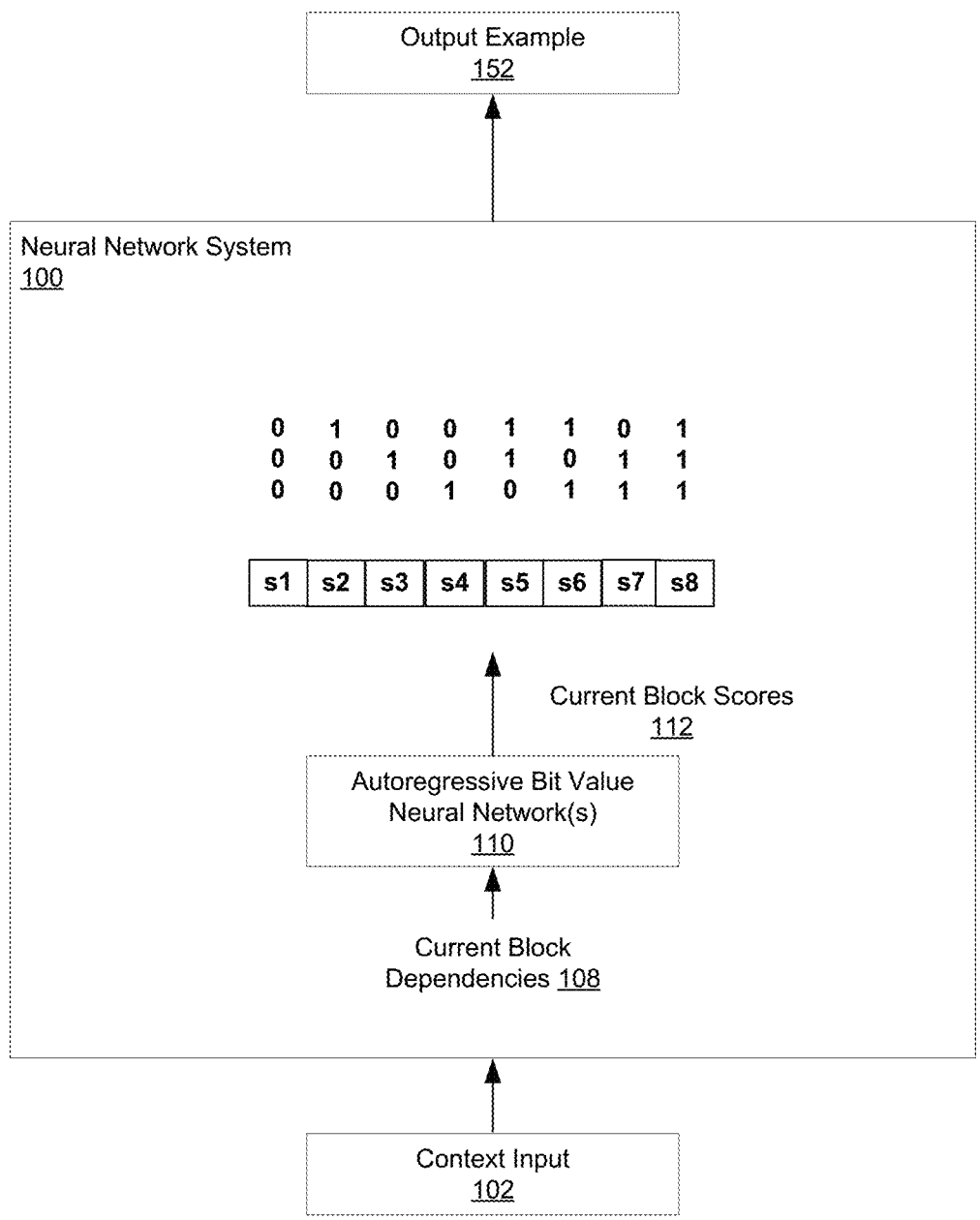
FIG. 1 shows an example neural network system.

FIG. 1 shows an example neural network system 100. The neural network system 100 is an example of a system implemented as computer programs on one or more computers in one or more locations, in which the systems, components, and techniques described below can be implemented.

The neural network system 100 receives a context input 102 and generates an output example 152 conditioned on the context input 102.

For example, the output example 152 can be a sequence of audio data, e.g., a waveform, that represents an utterance of a piece of text. In this example, the context input 102 can be the piece of text or linguistic features of the piece of text.

As another example, the output example 152 can be an image and the context input 102 can be text describing the desired contents of the image or a numeric representation of the desired contents of the image.

As another example, the output example 152 can be a video frame and the context input 102 can be a representation of the preceding frames in the video, i.e., the output example 152 is a prediction of the next frame in the video.

As another example, the output example 152 can be a sequence of text and the context input 102 can be audio data, i.e., the output example 152 is a transcription of an utterance captured by the audio data.

Generally, the output example 152 is an ordered collection of T, i.e., multiple, N-bit samples, e.g., T 4-bit values, 8-bit values, 16-bit values, 24-bit values.

For example, when the output example is speech waveform, the output example 152 can be considered to be an ordered, i.e., by time, collection of T N-bit amplitude values or compressed or companded amplitude values.

As another example, when the output example is an image, the output example 152 can be considered to be an ordered, i.e., by spatial location and color channel, collection of T N-bit color values.

The system generates the output example 152 using one or more autoregressive neural networks 110.

Generally, at a given forward pass, each of the autoregressive neural networks 110 is configured to generate values for a block of bits from the output example 152. Each block of bits includes a respective plurality of bits from the output example 152. In some implementations, each block of bits includes the same, fixed number of bits.

In particular, the system 100 maintains dependency data that partitions the T×N bits in the output example 152 into a plurality of blocks. The dependency data partitions the bits such that each bit in the output example belongs to exactly one block. Example partitioning of the bits into blocks will be described in more detail below with reference to FIGS. 2 and 3.

The dependency data also defines a dependency for each block in the output example. Generally, the dependency will specify that (i) one or more predetermined initial blocks in the output example do not depend on any other blocks in the output example but that (ii) each block other than the predetermined initial block(s) depends on at least one other block in the output example.

For a first block to depend on a second block means that, as the output example is being generated, the values of the bits in the first block will depend on the values of the bits in the second block. That is, the values of the bits in the second block must have already been generated in order to begin generating the values of the bits in the first block.

Example dependency schemes that can be reflected in the dependency data are described below with reference to FIGS. 2 and 3.

Generally, the system 100 obtains the dependency data and uses the same maintained dependency data for each output example that is generated by the system 100.

Each of the autoregressive neural network(s) 110 is configured to generate the values for a particular block of bits conditioned on the values of the bits in the blocks on which the particular block of bits depends and on the context input.

The autoregressive neural network 110 can be any appropriate autoregressive neural network 110 that has been configured to generate values for a block of bits at a given forward pass. For example, the network 110 can be a convolutional-based neural network, e.g., a modified WaveNet or PixelCNN. As another example, the network 110 can be a recurrent neural network, e.g., a modified PixelRNN. That is, one of these neural networks can be modified so that the output layer generates a respective score for each of a plurality of bit value combinations, i.e., instead of a score distribution over possible values for an entire sample. WaveNet is described in *WaveNet: A Generative Model for Raw Audio*, available at https://arxiv.org/abs/1609.03499. PixelCNN and PixelRNN are described in *Conditional Image Generation with PixelCNN Decoders*, available at https://arxiv.org/abs/1606.05328 and *Pixel Recurrent Neural Networks* available at https://arxiv.org/abs/1601.06759.

The system 100 generates the output example over multiple generation time steps, i.e., by generating one or more blocks of bits at each of the multiple generation time steps.

At each generation time step, the system 100 identifies one or more current blocks. A current block is a block for which, as of the generation time step, the values of the bits in all of the other blocks identified in the dependency for the block have already been generated.

The system 100 then generates the values of the bits in the one or more current blocks conditioned on, for each current block, the already generated values of the bits in the other blocks identified in the dependency for the current block.

For example, for a particular current block and at a given generation time step, a particular autoregressive bit value neural network 110 can receive the current block dependencies 108, i.e., the values of the bits in the blocks on which the current block depends, and generate current block scores 112. In the example of FIG. 1, the current block scores 112 include a respective score for each of a plurality of bit value combinations, with each bit value combination including a respective bit value for each of the bits in the current block. In particular, in the example of FIG. 1, the current block includes 3 bits and the scores include each possible combination of bit values for the 3 bits.

The system 100 can then select one of the bit value combinations in accordance with the scores, e.g., by sampling in accordance with the scores or by selecting the highest scoring combination, and then assign the values in the selected combination as the values for the corresponding bits in the current block.

In some implementations, the system 100 uses only a single autoregressive neural network 110 in generating the output example and generates only one block of bits at each generation time step.

In other implementations, the system 100 can generate multiple blocks of bits in parallel at each generation time step (if multiple current blocks have been identified as current blocks at the generation time step). In these implementations, the system 100 can generate the blocks in parallel using multiple instances of the same network 110 or can use different networks 110 for different ones of the current blocks. In the latter case, as will be described in more detail below, each network 110 is specific to a respective subset of the blocks and, when a current block at a given time step is in the subset assigned to the network 110, can be used to generate the current block while others of the networks 110 are generating blocks.

While the description in this specification generally describes the output example being generated conditioned on a context input, in some cases the system 100 generates the output example 152 without conditioning on any context input.

Once the output example 152 has been generated, the system 100 can provide the output example 152 as output, e.g., to a user device for presentation or playback to a user or to another system.

Figure 2:
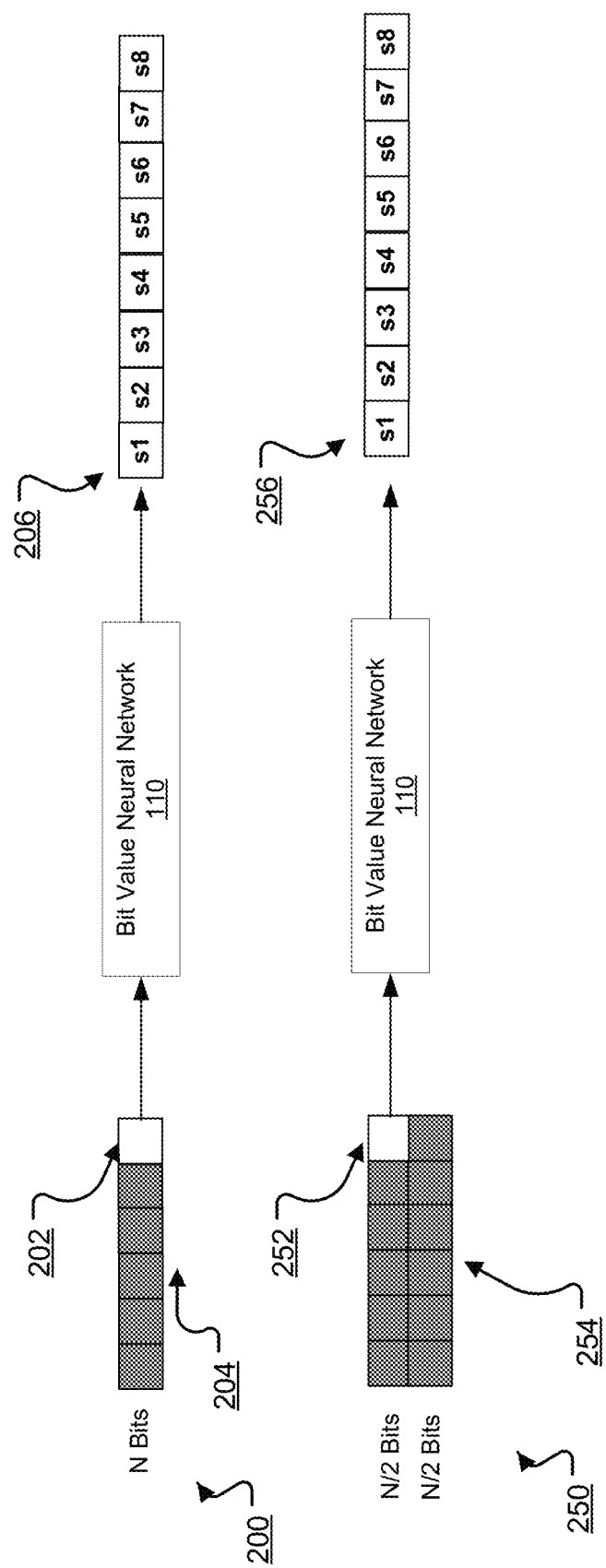
FIG. 2 shows two example dependencies.

FIG. 2 shows two example dependencies 200 and 250.

The example dependency 200 is an example of a dependency used by conventional systems that generate output examples in an auto-regressive manner. In the example dependency 200, there are six blocks of bits and six samples, the samples are ordered according to a sample order, and each block of bits includes all N bits from a corresponding one of the samples. The dependency then specifies that the block of bits for a given sample is dependent on the blocks of bits for the samples that are before the given sample in the sample order. For example, the block 202 corresponds to the last sample in the sample order and is therefore dependent on all of the shaded blocks 204, i.e., on all of the blocks corresponding to the other five samples. Thus, the output sample corresponding to the block 202 is dependent on all of the samples before it in the sample order. The bit value neural network 110 then generates scores 206 for various possible combinations of values for the bits in the block 202 conditioned on the already generated values of the bits in the shaded blocks 204 (and on the context input 102).

In the example dependency 250, however, there are still six samples, but a block of bits includes less than all of the bits in a sample. In particular, in the dependency 250, each block of bits includes half of the bits (N/2) in a given sample.

Thus, a block that includes the first half of the bits of a sample is dependent on the blocks of bits for the samples before the given sample in the sample order and the block that includes the second half of the bits in the sample is also dependent on the block that includes the first half of the bits in the sample.

For example, the block 252 which includes the second half of the bits in the sixth sample is dependent on the shaded blocks 254 in the figure, i.e., all of the blocks that include bits from the five samples before the sixth sample in the sample order and the block that includes the first half of the bits in the sixth sample. The bit value neural network 110 then generates scores 256 for various possible combinations of values for the bits in the block 202, i.e., for the second half of the bits in the six sample, conditioned on the already generated values of the bits in the shaded blocks 254 (and on the context input 102), i.e., on the values of the bits in the first five samples and the values of the first half of the bits in the sixth sample.

In both of the examples in FIG. 2, each block i) includes only bits from a single sample and ii) is dependent on all of the blocks before the block in the sample order.

In some cases, however, each block includes bits from multiple different samples and some of the blocks do not depend on all of the preceding blocks, allowing for output examples to be generated quicker. More generally, the dependency is not such that all of the block except the first blocks depend on all of the preceding blocks, i.e., at least some of the blocks do not depend on all of the preceding block.

Figure 3:
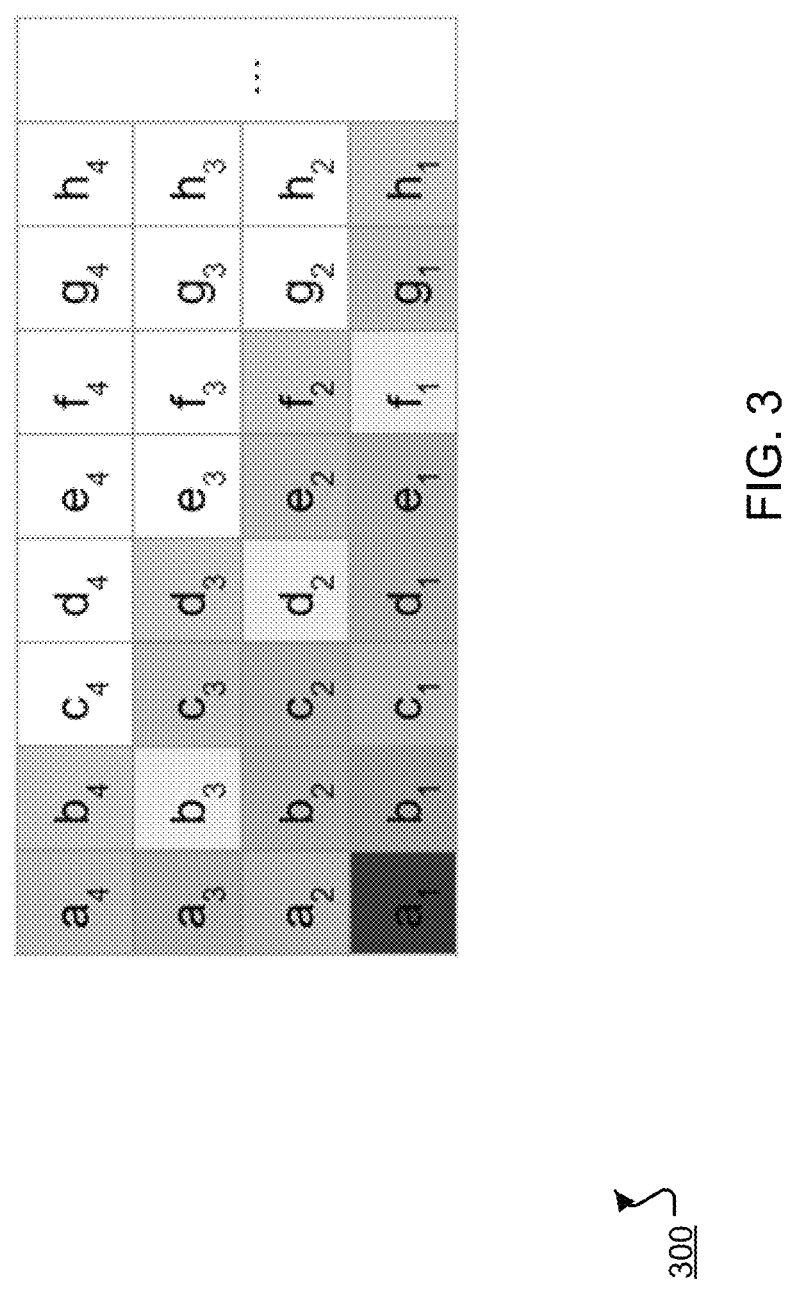

FIG. 3 shows another example dependency 300.

In the example dependency 300, the blocks have been arranged into a matrix structure having a plurality of rows, i.e., with each block having the same subscript being in the same row, and a plurality of columns, i.e., with each block having the same letter being in the same column.

In some cases, the matrix structure has not been reshaped and each block is an n×t block, with n being the number of bits from each sample in the block and t being the number of samples in the block. For example, block a1 may be a 4×2 block that includes the first 4 bits from the first 2 samples in the sample order or a 1×8 block that includes the first bit from the first 8 samples in the sample order.

In some other cases, the matrix structure has been reshaped and there are N*r total bits along the row dimension and T/r total "samples" along the column dimension, where r is an integer greater than one. In these cases, each block is a b×t block and there are N*r/b columns of blocks in the structure.

Additionally, the dependencies of the blocks in the dependency 300 have been restricted.

In particular, for each particular block of the plurality of blocks, the dependency identifies that the particular block is not dependent on any block that is more than H columns after the particular block in a row that is before the row of the particular block. In the example of FIG. 3, H is 1 and all of the blocks that are the same color/shade in FIG. 3 can all be generated at the same generation time step, i.e., can all be identified as current blocks at the same generation time step. However, H can be fixed to be any positive integer.

For example, at the first generation time step, block a1 is the only one that can be generated. At the second generation time step, block b1 is the only one that can be generated. At the third generation time step, however, both block c1 and block a2 can be generated, because block c1 is more than H columns after block a2 in a row that is before the row of block c1, i.e., is more than 1 column after block a2 in the row that is before the row of block c1. Skipping to the fifth generation time step, blocks a3, c2, and e1 can all be generated, i.e., can all be identified as current blocks at the fifth generation time step.

When more than one block can be identified as a current block at a given generation time step, different instances of the same auto-regressive neural network can be used to generate the values for all of the current blocks in parallel.

While not shown in FIG. 3, the dependencies of the blocks can be further restricted. In particular, the dependencies can be restricted such that, for a given block in row i and column j, the dependency identifies that the given block depends only on the values of bits in: (i) blocks 1 through j−1 in row i and, for each row i-k below row i, blocks 1 through (j−1+kH) of that row, with H being a fixed integer greater than one.

In these cases, the generation of the blocks can be further parallelized by assigning a different autoregressive neural network to each row of the matrix structure or to a group of rows in the matrix structure. In particular, at each time step and for each row, the system determines whether there is a block in the row that can be identified as a current block, i.e., as a block for which all of the other blocks identified in the dependency for the block have already been generated and, if so, generates the block using the neural network specific to the row.

While the dependency shown in FIG. 3 has been restricted and the dependency described above has been further restricted, the dependencies that have been removed for any given block, i.e., the blocks on which a given block is no longer dependent, but that the block would have been dependent on in a conventional scheme, have been selected to be the blocks that are least likely to impact the correct values for the bits in the current block. Accordingly, the restriction of the dependency does not have an overly adverse effect on the quality of the generated output example.

Figure 4:
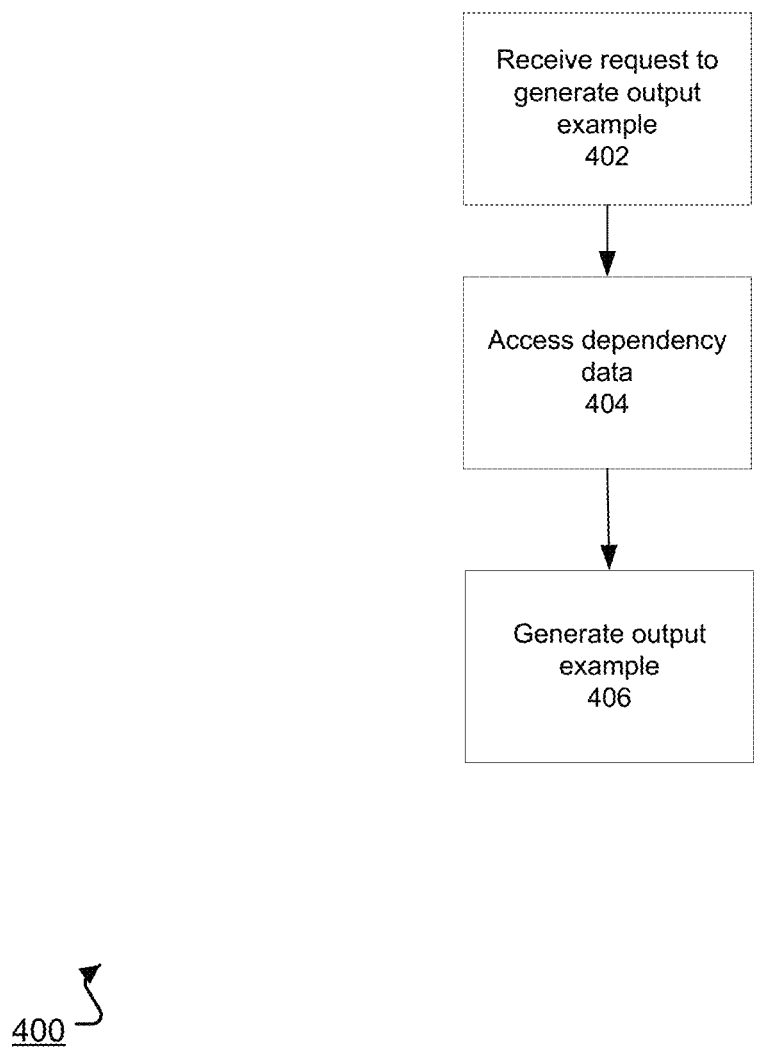
FIG. 4 is a flow diagram of an example process for generating an output example.

FIG. 4 is a flow diagram of an example process 400 for generating an output example. For convenience, the process 400 will be described as being performed by a system of one or more computers located in one or more locations. For example, a neural network system, e.g., the neural network system 100 of FIG. 1, appropriately programmed, can perform the process 400.

The system receives a request to generate an output example (step 402). In particular, the request specifies a context input and requests that an output example be generated conditioned on the context input. For example, the request can specify linguistic features of a text segment and request that a waveform be generated that is a verbalization of the text segment.

The system accesses dependency data that partitions the bits in the output example into blocks and assigns a dependency to each block (step 404). As described above, the dependency data partitions each bit in the output example to exactly one block and indicates that all of the blocks except for one or more predetermined initial blocks depend on one or more other blocks in the output example.

The system generates the output example by generating one or more blocks at each of multiple generation time steps (406). Generation at a given time step is described below with reference to FIG. 5. That is, the system continues performing the process described below with reference to FIG. 5 until values for all of the bits in the output example have been generated.

Figure 5:
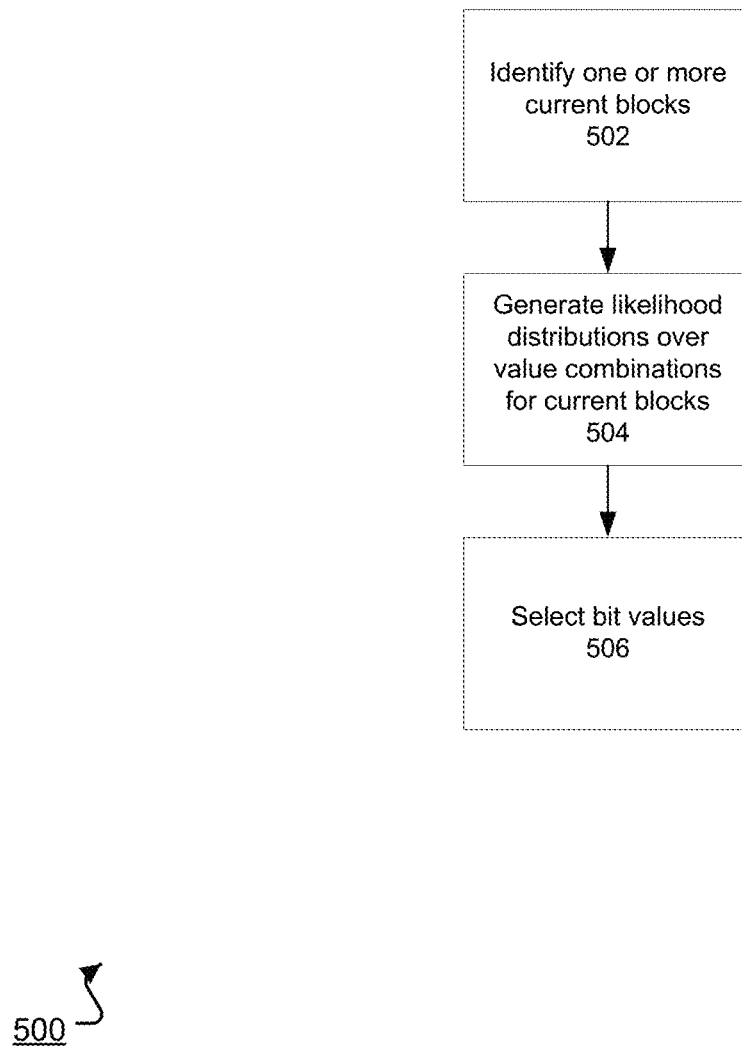
FIG. 5 is a flow diagram of an example process of generation at a single generation time step.

FIG. 5 is a flow diagram of an example process 500 for generation at a single time step. For convenience, the process 500 will be described as being performed by a system of one or more computers located in one or more locations. For example, a neural network system, e.g., the neural network system 100 of FIG. 1, appropriately programmed, can perform the process 500.

The system identifies one or more current blocks for the time step (step 502). As described above, the system identifies as current blocks all blocks that have not yet been generated but for which the dependency is satisfied. The dependency for a block is satisfied when all of the blocks on which the block depends on have already been generated.

The system generates a respective likelihood distribution for each identified current block (step 504). The likelihood distribution for a given current block is a likelihood distribution over possible value combinations, with each value combination assigning a respective bit value for each of the bits in the current block.

The system can generate the likelihood distribution for the current block by conditioning an auto-regressive neural network on the context input and on the blocks on which the current block depends. In some cases, as described above, the system generates multiple likelihood distributions in parallel when multiple current blocks have been identified.

The system selects bit values for the bits in each current block from the likelihood distribution for the current block (step 506). That is, for each current block, the system selects a value combination from the possible value combinations in accordance with the likelihood distribution and assigns the respective bit values in the selected value combination to the corresponding bits in the current block. For example, the system can sample from the likelihood distribution or can select the value combination having the highest likelihood.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them.

Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A method comprising:
receiving a request to generate an output example of a particular type having T N-bit samples, wherein N and T are respective integers greater than one, and wherein each of the N*T bits in the output example has a respective value;
accessing dependency data, wherein the dependency data:
partitions the N*T bits in the output example into a plurality of blocks of bits, each block of bits comprising a respective plurality of bits from the output example,
for each of a plurality of the blocks, defines a respective dependency for the block that identifies one or more other blocks in the plurality of blocks on which the respective values of the bits in the block depend; and
wherein the dependency data arranges the blocks into a matrix structure having a plurality of rows and a plurality of columns, and wherein, for each particular block of the plurality of blocks, the dependency identifies that the particular block is dependent on any block which is before the particular block in the row of the particular block, and is not dependent on any block that is more than H columns after the particular block in a row that is before the row of the particular block, wherein H is a fixed positive integer; and generating the output example by, at each of a plurality of generation time steps:

identifying one or more current blocks for the generation time step, wherein each current block is a block for which the respective values of the bits in all of the other blocks identified in the dependency for the block have already been generated; and generating, using one or more autoregressive neural networks, the respective values of the bits in the current blocks for the generation time step conditioned on, for each current block, the already generated respective values of the bits in the other blocks identified in the dependency for the current block.

2. The method of claim 1, wherein, for generation time steps at which a plurality of current blocks are identified, the current blocks are generated in parallel.

3. The method of claim 1, wherein, for a given block in row i and column j, the dependency identifies that the given block depends only on the respective values of bits in:

blocks 1 through j−1 in row i and, for each row i−k below row i, blocks 1 through (j−1+kH), wherein k is an integer.

4. The method of claim 3, wherein identifying one or more current blocks for the generation time step comprises, determining, for each row of the plurality of rows, whether there is a block in the row for which all of the other blocks identified in the dependency for the block have already been generated.

5. The method of claim 4, wherein generating the respective values of the bits in the current blocks for the generation time step conditioned on, for each current block, the already generated respective values of the bits in the other blocks identified in the dependency for the current block comprises, for each row in which a current block is identified:

generating a network input that conditions an autoregressive neural network that is specific to the row on the respective values of the bits in the blocks identified in the dependency for the current block in the row;

processing the network input using the autoregressive neural network that is specific to the row, wherein the autoregressive neural network is configured to process the network input to generate a likelihood distribution over possible respective value combinations, each possible respective value combination including a respective bit respective value for each of the bits in the current block;

selecting a respective value combination from the possible respective value combinations in accordance with the likelihood distribution, and assigning the respective bit respective values in the selected respective value combination to the corresponding bits in the current block.

6. The method of claim 4, wherein generating the respective values of the bits in the current blocks for the generation time step conditioned on, for each current block, the already generated respective values of the bits in the other blocks identified in the dependency for the current block comprises, for each current block:

generating a network input that conditions an autoregressive neural network on the respective values of the bits in the blocks identified in the dependency for the current block;

processing the network input using an instance of the autoregressive neural network, wherein the autoregressive neural network is configured to process the network input to generate a likelihood distribution over possible respective value combinations, each possible respective value combination including a respective bit respective value for each of the bits in the current block;

selecting a respective value combination from the possible respective value combinations in accordance with the likelihood distribution, and assigning the respective bit respective values in the selected respective value combination to the corresponding bits in the current block.

7. The method of claim 1, wherein each block also depends on a context input, and wherein generating the respective values of the bits in the current blocks is also conditioned on the context input.

8. A system comprising one or more computers and one or more storage devices storing instructions that when executed by the one or more computers cause the one or more computers to perform operations comprising:

receiving a request to generate an output example of a particular type having T N-bit samples, wherein N and T are respective integers greater than one, and wherein each of the N*T bits in the output example has a respective value;

accessing dependency data, wherein the dependency data:

partitions the N*T bits in the output example into a plurality of blocks of bits, each block of bits comprising a respective plurality of bits from the output example, for each of a plurality of the blocks, defines a respective dependency for the block that identifies one or more other blocks in the plurality of blocks on which the respective values of the bits in the block depend; and wherein the dependency data arranges the blocks into a matrix structure having a plurality of rows and a plurality of columns, and wherein, for each particular block of the plurality of blocks, the dependency identifies that the particular block is dependent on any block which is before the particular block in the row of the particular block, and is not dependent on any block that is more than H columns after the particular block in a row that is before the row of the particular block, wherein H is a fixed positive integer; and generating the output example by, at each of a plurality of generation time steps:

identifying one or more current blocks for the generation time step, wherein each current block is a block for which the respective values of the bits in all of the other blocks identified in the dependency for the block have already been generated; and generating, using one or more autoregressive neural networks, the respective values of the bits in the current blocks for the generation time step conditioned on, for each current block, the already generated respective values of the bits in the other blocks identified in the dependency for the current block.

9. The system of claim 8, wherein, for generation time steps at which a plurality of current blocks are identified, the current blocks are generated in parallel.

10. The system of claim 8, wherein, for a given block in row i and column j, the dependency identifies that the given block depends only on the respective values of bits in:

blocks 1 through j−1 in row i and, for each row i−k below row i, blocks 1 through (j−1+kH), wherein k is an integer.

11. The system of claim 10, wherein identifying one or more current blocks for the generation time step comprises, determining, for each row of the plurality of rows, whether there is a block in the row for which all of the other blocks identified in the dependency for the block have already been generated.

12. The system of claim 11, wherein generating the respective values of the bits in the current blocks for the generation time step conditioned on, for each current block, the already generated respective values of the bits in the other blocks identified in the dependency for the current block comprises, for each row in which a current block is identified:
    generating a network input that conditions an autoregressive neural network that is specific to the row on the respective values of the bits in the blocks identified in the dependency for the current block in the row;
    processing the network input using the autoregressive neural network that is specific to the row, wherein the autoregressive neural network is configured to process the network input to generate a likelihood distribution over possible respective value combinations, each possible respective value combination including a respective bit respective value for each of the bits in the current block;
    selecting a respective value combination from the possible respective value combinations in accordance with the likelihood distribution, and
    assigning the respective bit respective values in the selected respective value combination to the corresponding bits in the current block.

13. The system of claim 11, wherein generating the respective values of the bits in the current blocks for the generation time step conditioned on, for each current block, the already generated respective values of the bits in the other blocks identified in the dependency for the current block comprises, for each current block:
    generating a network input that conditions an autoregressive neural network on the respective values of the bits in the blocks identified in the dependency for the current block;
    processing the network input using an instance of the autoregressive neural network, wherein the autoregressive neural network is configured to process the network input to generate a likelihood distribution over possible respective value combinations, each possible respective value combination including a respective bit respective value for each of the bits in the current block;
    selecting a respective value combination from the possible respective value combinations in accordance with the likelihood distribution, and
    assigning the respective bit respective values in the selected respective value combination to the corresponding bits in the current block.

14. The system of claim 8, wherein each block also depends on a context input, and wherein generating the respective values of the bits in the current blocks is also conditioned on the context input.

15. One or more non-transitory computer storage media storing instructions that when implemented by one or more computers cause the one or more computers to perform operations comprising:
    receiving a request to generate an output example of a particular type having T N-bit samples, wherein N and T are respective integers greater than one, and wherein each of the N*T bits in the output example has a respective value;
    accessing dependency data, wherein the dependency data:
        partitions the N*T bits in the output example into a plurality of blocks of bits, each block of bits comprising a respective plurality of bits from the output example,
        for each of a plurality of the blocks, defines a respective dependency for the block that identifies one or more other blocks in the plurality of blocks on which the respective values of the bits in the block depend; and
        wherein the dependency data arranges the blocks into a matrix structure having a plurality of rows and a plurality of columns, and wherein, for each particular block of the plurality of blocks, the dependency identifies that the particular block is dependent on any block which is before the particular block in the row of the particular block, and is not dependent on any block that is more than H columns after the particular block in a row that is before the row of the particular block, wherein H is a fixed positive integer; and
    generating the output example by, at each of a plurality of generation time steps:
        identifying one or more current blocks for the generation time step, wherein each current block is a block for which the respective values of the bits in all of the other blocks identified in the dependency for the block have already been generated; and
        generating, using one or more autoregressive neural networks, the respective values of the bits in the current blocks for the generation time step conditioned on, for each current block, the already generated respective values of the bits in the other blocks identified in the dependency for the current block.

16. The computer storage media of claim 15, wherein, for generation time steps at which a plurality of current blocks are identified, the current blocks are generated in parallel.

17. The computer storage media of claim 15, wherein, for a given block in row i and column j, the dependency identifies that the given block depends only on the respective values of bits in:
    blocks 1 through j−1 in row i and, for each row i−k below row i, blocks 1 through (j−1+kH), wherein k is an integer.

18. The computer storage media of claim 17, wherein identifying one or more current blocks for the generation time step comprises, determining, for each row of the plurality of rows, whether there is a block in the row for which all of the other blocks identified in the dependency for the block have already been generated.

19. The computer storage media of claim 18, wherein generating the respective values of the bits in the current blocks for the generation time step conditioned on, for each current block, the already generated respective values of the bits in the other blocks identified in the dependency for the current block comprises, for each row in which a current block is identified:
    generating a network input that conditions an autoregressive neural network that is specific to the row on the respective values of the bits in the blocks identified in the dependency for the current block in the row;

processing the network input using the autoregressive neural network that is specific to the row, wherein the autoregressive neural network is configured to process the network input to generate a likelihood distribution over possible respective value combinations, each possible respective value combination including a respective bit respective value for each of the bits in the current block;

selecting a respective value combination from the possible respective value combinations in accordance with the likelihood distribution, and assigning the respective bit respective values in the selected respective value combination to the corresponding bits in the current block.

20. The computer storage media of claim 18, wherein generating the respective values of the bits in the current blocks for the generation time step conditioned on, for each current block, the already generated respective values of the bits in the other blocks identified in the dependency for the current block comprises, for each current block:

generating a network input that conditions an autoregressive neural network on the respective values of the bits in the blocks identified in the dependency for the current block;

processing the network input using an instance of the autoregressive neural network, wherein the autoregressive neural network is configured to process the network input to generate a likelihood distribution over possible respective value combinations, each possible respective value combination including a respective bit respective value for each of the bits in the current block;

selecting a respective value combination from the possible respective value combinations in accordance with the likelihood distribution, and assigning the respective bit respective values in the selected respective value combination to the corresponding bits in the current block.

\* \* \* \* \*